United States Patent [19]

Drago et al.

[11] Patent Number: 5,720,897
[45] Date of Patent: Feb. 24, 1998

[54] TRANSITION METAL BLEACH ACTIVATORS FOR BLEACHING AGENTS AND DETERGENT-BLEACH COMPOSITIONS

[75] Inventors: Russell S. Drago; Xu Cheng, both of Gainesville, Fla.

[73] Assignee: University of Florida, Gainesville, Fla.

[21] Appl. No.: 377,380

[22] Filed: Jan. 25, 1995

[51] Int. Cl.$^6$ .................... C01B 15/04; C08F 4/42
[52] U.S. Cl. .................... 252/186.33; 252/186.1; 252/186.38; 502/104
[58] Field of Search .................... 252/186.1, 186.33, 252/186.38; 502/104; 510/518, 531

[56] References Cited

U.S. PATENT DOCUMENTS

| | | | |
|---|---|---|---|
| 3,156,654 | 11/1964 | Konecny et al. | 252/95 |
| 4,392,975 | 7/1983 | Tourdot et al. | 252/99 |
| 4,430,243 | 2/1984 | Bragg | 252/91 |
| 4,478,733 | 10/1984 | Oakes | 252/99 |
| 4,626,373 | 12/1986 | Finch et al. | 252/96 |
| 4,664,837 | 5/1987 | Gray | 252/99 |
| 4,728,455 | 3/1988 | Rerek | 252/99 |
| 4,810,410 | 3/1989 | Diakun et al. | 252/102 |
| 5,002,682 | 3/1991 | Bragg et al. | 252/99 |
| 5,021,187 | 6/1991 | Harriott et al. | 252/186.38 |
| 5,041,142 | 8/1991 | Ellis | 8/111 |
| 5,114,606 | 5/1992 | van Vliet et al. | 252/103 |
| 5,114,611 | 5/1992 | van Kralingen et al. | 252/186.33 |
| 5,151,212 | 9/1992 | Bell et al. | 252/186.38 |
| 5,153,161 | 10/1992 | Kerschner et al. | 502/167 |
| 5,194,416 | 3/1993 | Jureller et al. | 502/167 |
| 5,227,084 | 7/1993 | Martens et al. | 252/95 |
| 5,244,594 | 9/1993 | Favre et al. | 252/186.33 |
| 5,246,612 | 9/1993 | Van Dijk et al. | 252/102 |
| 5,246,621 | 9/1993 | Favre et al. | 252/186.33 |
| 5,256,779 | 10/1993 | Kerschner et al. | 540/465 |
| 5,273,674 | 12/1993 | Kottwitz et al. | 252/95 |
| 5,280,117 | 1/1994 | Kerschner et al. | 540/465 |
| 5,314,635 | 5/1994 | Hage et al. | 252/102 |

FOREIGN PATENT DOCUMENTS 0302774  2/1989  European Pat. Off. .

*Primary Examiner*—Shean C. Wu
*Attorney, Agent, or Firm*—Kerkam, Stowell, Kondracki & Clarke; Dennis P. Clarke

[57] ABSTRACT

Transition metal containing composition for use as a bleach catalyst comprising at least one transition metal ion coordinated with at least one chelating ligand to form a complex capable of binding $O_2H^-$. The ligand(s) should have at least two strong donor functional groups capable of coordinating with a single one of the transition metal ions in the complexes to form a six-member or larger ring. The complexes are capable of coordinating peroxide groups while the ligand functions to substantially prevent precipitation of hydroxides of the transition metal ions in aqueous alkaline solutions of the transition metal containing composition. A detergent-bleach composition comprising an effective amount of a peroxide bleaching agent and an effective amount of the bleach catalyst described above, and a bleaching agent composition comprising a peroxide compound present in an amount effective to impart a bleaching action and a catalyst present in an effective amount to promote the bleaching action of the peroxide compound comprising the transition metal composition described above are also disclosed, as well as a catalyst present in an effective amount to promote the bleaching action of peroxide compounds in a detergent-bleach composition comprising the transition metal composition described above.

21 Claims, No Drawings

TRANSITION METAL BLEACH ACTIVATORS FOR BLEACHING AGENTS AND DETERGENT-BLEACH COMPOSITIONS

BACKGROUND OF THE INVENTION

1. Field of the Invention

The present invention relates to activators or catalysts which enhance the bleaching action of peroxide or peroxide liberating bleaching agents and bleaching agents and detergent-bleach compositions containing the activators.

2. Description of Related Prior Art

Peroxide-type bleaching agents have long been employed in laundering, either alone or in conjunction with detergents in so-called "detergent-bleach compositions" for removing stubborn stains, e.g., wine, tea and fruit, from fabrics. Peroxide bleaching agents lose much of their effectiveness at lower washwater temperatures, e.g., below 60° C., and in the basic solutions required for cleaning. It is known to utilize bleach catalysts, e.g., transition metal activators, to enhance the effectiveness of peroxide bleaching agents at the lower temperatures demanded of household detergents and in commercial laundering operations for safety reasons. See e.g., U.S. Pat. Nos. 3,156 654; 5,314,635; 5,280,117; 5,273,674; 5,256,779; 5,246,621; 5,246,612; 5,244,594; 5,227,084; 5,194,416; 5,153,161; 5,151,212; 5,114,611; 5,114,606; 5,041,142; 5,021,187; 5,002,682; 4,810,410; 4,664,837; 4,430,243; 4,392,975; 4,728,455; 4,626,373; 4,478,733; and EP 84 302 774.9. Many of the transition metal catalysts, however, promote the decomposition of peroxide from the bleaching agents in such a manner that only a small fraction of the bleaching action of the agent is realized. Sequestrants for the transition metals have been employed in bleaching agents and detergent-bleach compositions in conjunction with the activators to control the loss of peroxide and precipitation of the metal hydroxide. All of the commonly employed inexpensive sequestrants also inhibit the bleach activation mechanism. A delicate balance between the transition metal activator/catalyst and the sequestrant must, therefore, be achieved in order to optimize the bleaching action while preventing metal hydroxide precipitation and minimizing unwanted decomposition of the peroxide bleaching agent. However, when utilizing the transition metal activator/catalysts of the prior art combined with conventional sequestrants, it has been impossible to achieve the maximum bleaching action of the peroxide bleaching agent at low temperatures.

Another problem associated with the use of transition metal activator/catalysts in laundering operations is the inherent instability of transition metal ions under the alkaline conditions prevailing in normal washing operations. Transition metals tend to precipitate from alkaline detergent solutions as hydroxides. The precipitate may deposit on fabrics being laundered, thereby discoloring them or removing the metal ion from solution, thus rendering it inactive.

It has been proposed to employ chelating agents to impart hydrolytic stability to the transition metal moiety of the transition metal activator/catalysts; however, none of these entirely remove the above-discussed drawbacks. Moreover, the addition of still other agents to diminish those drawbacks themselves give rise to even more disadvantages, including, but not limited to, increased cost.

Accordingly, it is an object of the present invention to provide novel transition metal activator/catalysts for peroxide-type bleaching agents and detergent-bleach compositions which are not subject to the above-noted disadvantages associated with prior art systems.

It is a further object of the present invention to provide peroxide-type bleaching agents and detergent-bleach compositions containing novel transition metal activator/catalysts which are improved over prior art compositions.

The foregoing and other objects of the invention, as well as a complete understanding of the features and advantages thereof, are revealed by the following description and claims.

SUMMARY OF THE INVENTION

One embodiment of the invention comprises a transition metal containing composition for use as a bleach catalyst comprising at least one transition metal ion coordinated with at least one ligand to form a water-soluble complex selected from the group consisting of monomeric, dimeric and oligomeric complexes and mixtures thereof capable of binding peroxide ions. The ligand should have at least two, and less than six, strong donor functional groups capable of coordinating with at least one of the transition metal ions to format least a six-member or larger ring. The transition metal containing composition has coordinating positions available for and capable of coordinating peroxide groups in aqueous alkaline solutions and the ligand functions to substantially prevent precipitation of hydroxides of the transition metal ions in aqueous alkaline solutions of the transition metal containing composition.

A second embodiment of the invention relates to a detergent-bleach composition comprising an effective amount of a peroxide bleaching agent and an effective amount of the bleach catalyst described above.

A further embodiment of the invention is a bleaching agent composition comprising a peroxide compound present in an amount effective to impart a bleaching action and a catalyst present in an effective amount to promote the bleaching action of the peroxide compound comprising the transition metal composition described above.

Yet another embodiment of the invention relates to a catalyst present in an effective amount to promote the bleaching action of peroxide compounds in a detergent-bleach composition comprising the transition metal composition described above.

DETAILED DESCRIPTION OF THE INVENTION

The present invention is predicated on the discovery that monomeric, dimeric or oligomeric transition metal complexes comprising at least one transition metal ion coordinated with one multidentate or plural ligands having at least two donor functional groups are highly superior as peroxide-type bleaching agent activators or catalysts in aqueous alkaline solutions to those of the prior art provided that the ligands employed are such that they are capable of coordinating with at least one transition metal ion in a monomer, dimer or oligomer to form a complex in which a weak ligand donor group including water or hydroxide in a strong binding position of the metal complex can be displaced by $HO_2^-$. Chelate ligands which coordinate with the single transition metal ion to form at least one six-member or larger ring provide an easily displaced group.

Metal ions that bind ligands with six equal metal-ligand bond distances have six "strong" binding positions. Metal ions that have tetragonal structures with four metal-ligand distances that are shorter than the other two metal-ligand distances have four "strong" binding and two "weak" binding positions. The number of strong binding positions for a particular metal ion can be determined by those skilled in the art from the d-electron configurations of the metal ion.

The dimeric or oligomeric transition metal complexes of the invention not only function as highly effective activators or catalysts for peroxide-type bleaching agents by having coordinating positions open for and capable of coordinating peroxide groups in aqueous alkaline solutions in such a way that the peroxide groups are available for bleaching, but make the peroxide unavailable for undesirable decomposition mechanisms which lead to the precipitation of transition metal hydroxides.

It will be understood by those skilled in the art that the phrase "ligand having at least two donor functional groups capable of coordinating with a single transition metal ion to form a monomeric complex wherein the functional groups coordinate with a single transition metal ion to format least a six-member ring" is not intended to imply that the catalytic transition metal complex which forms the crux of the present invention is a monomeric complex of a single transition metal ion. Rather, it is intended as a definition of the ligand which can be employed to prepare the complexes of transition metal ions which comprise the catalysts of the invention.

The remaining functional groups, if any, coordinate so as not to strongly bind to all of the strong binding positions of the transition metal ion. Ligands with functional groups that form a six-member or larger ring upon metal binding or multidentate ligands in which the number of functional groups are limited lead to complexes capable of coordinating peroxide groups by displacing a functional group or water in aqueous alkaline solutions while the ligand functions to substantially prevent precipitation of hydroxides of the transition metal ions in aqueous alkaline solutions of the transition metal containing composition.

While it is postulated that the dimeric or oligomeric complexes of the transition metal possess "open" coordinating positions for coordinating peroxide groups released by the peroxide-type bleaching agents in alkaline solutions in such a manner that they are "held" or are available substantially only for bleaching functions, applicants do not wish to be bound by any theory as to the mechanism of the invention. These "open" coordinating positions are occasioned by the fact that the monomeric, dimeric or oligomeric nature of the complex renders the ligands incapable of binding strongly to all of the coordinating positions available on a metal ion. In the transition metal bleach catalysts and activators of the prior art, all of the coordinating positions on the metal ion are taken up by the ligands (as in the monomeric complexes formed by reacting a single transition metal ion with chelates such that the donor functional groups of the ligands form very stable five-member rings with the metal ion). Although this stable binding prevents precipitation of the metal hydroxide, this state is less catalytically active because $HO_2^-$ cannot displace the strongly bound functional group of the ligand and coordination of the peroxide to the metal catalyst cannot occur.

Suitable metals for forming the complex catalysts of the invention include any of the so-called transition metals including, but not limited to, Cu (II), Mn (II), Co (II), Fe (II), Fe (III), Ni (II), Ti (IV), Mo (V), Mo (VI), W (VI), Ru (III) and Ru (IV), as well as mixtures thereof, it being understood that dimers and oligomers containing two or more different transition metal ions are contemplated by the invention. The preferred transition metals are Cu (II), Mn (II), Fe (II), Fe (III) and mixtures thereof. It should be understood that in the peroxide containing solutions, higher oxidation states of these metal ions may be involved in the mechanism. It should also be understood that metal ions such as $Zn^{2+}$, $Mg^{2+}$, etc., that are not in themselves catalytically active can form dimers and oligomers in combination with active metals that impart desirable solubility to the complexes.

Any ligand containing at least two donor functional groups which are capable of coordinating with a particular transition metal(s) to form a monomeric, dimeric or oligomeric complex, i.e., one containing one or more transition metal ions, may be employed in the practice of the invention, provided that the ligand(s) selected is one that is capable of reacting with a transition metal ion so as to form complexes wherein the donor functional groups coordinate the transition metal ion to form at least a six-member ring to provide a weakly bound functional group. Exemplary of such ligands are 2-pyridine acetic acid, 2-aminoethyl pyridine, 2-N-methyl-aminoethyl pyridine, 2-aminoethylimidazole, 2-imidazole acetic acid, 2-aminoethylquinoline, 2-quinoline acetic acid and dicyclohexyldiamine.

It will also be understood by those skilled in the art that the compositions of the invention also include mixtures of monomeric, dimeric and oligomeric complexes formed by transition metal ions with these ligands.

The complexes of the invention are prepared as follows:

(1) By adding at least a four-fold excess of the ligand and the metal chloride to water buffered at pH 8 with bicarbonate.

(2) A 2:1 ratio of ligand to copper is prepared in water. Evaporation of the solvent produces the desired complex, Cu (py AA), 0.5 $H_2O$.

(3) A different composition results when the complex is prepared in methanol using a 1:1 ratio of copper (II) chloride to py AA in water.

(4) A different composition results when a 1:2 ratio of ligand to copper (II) chloride solution is prepared and heated at 90° C. overnight. $Cu_2$ py $AACl_3$ 0.5 $H_2O$.

All are active catalysts in the presence of excess ligand.

The complexes of the invention may be employed in combination with any of the conventional peroxide-type bleaching agents or with any conventional detergent-bleach compositions.

The compositions of the invention can be formulated by combining effective amounts of the components of the bleaching agents and detergent-bleach compositions as substantially dry solids. The term "effective amounts" as used herein means that the ingredients are present in quantities such that each of them is operative for its intended purpose when the resulting mixture is combined with water to form an aqueous medium which can be used to wash clothes, fabrics and other articles.

When formulating a detergent-bleach composition, the composition can be formulated to contain a surface active agent in an amount of from about 1% to about 50% by weight, preferably about 5% to about 30% by weight of the composition; from about 0% to about 80% by weight of total detergent builder; and from about 5% to about 50% by weight, preferably from about 10% to about 35% by weight of peroxide-type bleaching agent. The transition metal catalysts are effectively employed in amounts ranging from about 1% to about 20% by weight, based on the weight of the detergent-bleach composition.

Suitable detergents or surface active agents include soaps, water-soluble salts (e.g., Na) of alkylbenzene sulphonates, alkyl sulfates, etc.; condensation products of 1–30 moles of ethylene oxide with one mole of branched or straight chain, primary or secondary alcohol having 8 to 22 carbon atoms.

Classes and species of surfactants useful in the invention appear in "Surface Active Agents," Vol. II by Schwarz, Pery and Berch (Interscience, 1959), the disclosure of which is incorporated herein by reference.

Suitable builders include sodium and potassium tetraborates, neutral silicates, sodium carbonate, alkylmalonates and alkylsuccinates.

Peroxide bleaches useful in the present invention include sodium perborate, sodium percarbonate, sodium persilicate, sodium perphosphate, sodium perpyrophosphate and urea peroxide.

When formulating bleaching agents according to the present invention, the peroxide-type bleaching agent is admixed with the transition metal catalyst as substantially dry solids. An effective amount of catalyst to be admixed with the bleaching agent is from about 1% to about 20% by weight based on the weight of the bleaching agent.

EXAMPLE 1

One ml of a solution of $CuCl_2$ ($1\times10^{-4}$M) containing one equivalent of 2-pyridine acetic acid hydrochloride was added to 2.0 ml of quinaldine blue ($3\times10^{-5}$M) solution buffered at pH 9 with sodium borate (0.01M) in a 10 mm path-length optical cell. To this solution, 0.5 ml of hydrogen peroxide ($2\times10^{-3}$M) solution was added. The cell was then capped and shaken vigorously for 10 seconds and then placed in a Perkin-Elmer Lambda 6 spectrophotometer. The absorbance at 600 nm is followed over time. No species in the cell other than quinaldine blue absorbs at 600 nm. Thus, the rate of decrease of the absorbance is a measurement of the rate of the oxidation reaction. The reaction at room temperature led to a rate of the disappearance of quinaldine blue of $1.3\times10^{-3}$ absorbance units per second.

EXAMPLE 2

A series of experiments were carried out using the conditions of Example 1, except the mole ratio of 2-pyridine acetic acid to copper chloride was varied. The rate of disappearance of quinaldine blue is given in Table 1 for these different experiments and Example 1.

TABLE 1

| REACTION RATES OF CATALYSTS WITH QUINALDINE BLUE | |
| --- | --- |
| Ligand: Metal Ratio | Reaction Rate ($\times10^{-3}$) |
| 1 | 1.28 |
| 2 | 2.27 |
| 4 | 6.87 |
| 8 | 15.00 |
| 12 | 12.23 |
| 24 | 3.97 |

Quinaldine blue is oxidized very slowly by $H_2O_2$. The fastest rates found with chelates that form five-membered rings are an order of magnitude slower.

EXAMPLE 3

In an attempt to determine the structure of the complex, a solution containing 0.005 moles of 2-pyridine acetic acid hydrochloride, 0.005 moles of KOH, 0.005 moles of $CuCl^2$ and 5 ml of 30% $H_2O_2$ was allowed to evaporate overnight. After drying the solid in a vacuum oven at 50° C. for two hours, the powder was redissolved in a 1:1 volume mixture of $CH_3OH/CH_2Cl_2$. After several days, a mixture of powder and dark brown crystals was obtained. The X-ray crystal structure of the brown crystals showed this material to be:

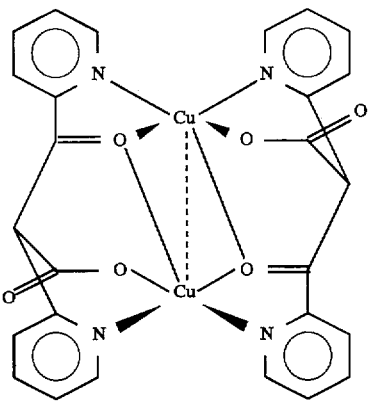

EXAMPLE 4

The conditions of Example 1 were repeated, except the brown crystals of Example 3 were used. The observed reaction rate is $3.9\times10^{-3}$.

EXAMPLE 5

The activation of peroxide can also be illustrated by bleaching action on a brown paper towel. 50 ml of a solution of $1\times10^{-4}$M manganese 2-pyridine acetic acid, 10 ml of $2.5\times10^{-3}$M copper chloride and 5 ml of 30% $H_2O_2$ were added to 150 ml of a 0.01M sodium borate buffer solution (pH=9) containing a suspension of 2.5 grams of brown paper towel. After four hours,-another 5 ml of 30% $H_2O_2$ was added to the mixture. After a total of 24 hours, the solution was removed by filtration and a light tan solid resulted. Neither copper/2-pyridine acetic acid or the manganese complex alone was as active.

EXAMPLE 6

The experiments in Example 2 were carried out, except the ligand 2-ethylaminopyridine ($2-NH_2CH_2CH_2C_5H_4N$) was used. The results in Table 2 were obtained.

TABLE 2

| REACTION RATES OF QUINALDINE BLUE OXIDATION | |
| --- | --- |
| Ligand: Metal Ratio | Reaction Rate ($\times10^{-3}$) |
| 1 | 5.08 |
| 2 | 5.13 |
| 4 | 4.32 |
| 8 | 4.03 |

EXAMPLE 7

Different kinds of metal ions ($Cu^{2+}$, $Mn^{2+}$, $Fe^{3+}$, $Zn^{2+}$) with ligands 2-pyridyl acetic acid (PYAA) and 2-(2-aminoethyl)pyridine (AEP) were used as catalysts for activating hydrogen peroxide to oxidize allyl alcohol in basic aqueous solution.

A 50 ml bicarbonate buffer solution (pH=8) containing $1.5\times10^{-5}$ moles of metal ion, $12\times10^{-5}$ moles of 2-pyridyl acetic acid hydrochloride (or $3\times10^{-5}$ moles of 2-(2-aminoethyl)pyridine), $3\times10^{-3}$ moles of allyl alcohol and $1.5\times10^{-1}$ moles of hydrogen peroxide was stirred at room temperature. The oxidation reaction was monitored by the disappearance of allyl alcohol in the GC and acetone was used as an internal standard. The results are shown in Table 3.

TABLE 3

CATALYZED OXIDATION OF ALLYL ALCOHOL

| Compound | Time (hours) | % Conversion |
|---|---|---|
| Cu—PYAA | 24 | 53 |
| $Cu_{0.5}$—$Mn_{0.5}$—PYAA | 1 | 23 |
|  | 24 | 45 |
| $Cu_{0.5}$—$Fe_{0.5}$—PYAA | 1 | 8 |
|  | 24 | 33 |
| $Cu_{0.5}$—$Zn_{0.5}$—PYAA | 1 | 4 |
|  | 24 | 39 |
| Cu—AEP | 1 | 4 |
|  | 24 | 28 |
| $Cu_{0.5}$—$Fe_{0.5}$—AEP | 1 | 16 |
|  | 24 | 22 |
| Fe—AEP | 24 | 9 |
| $CuCl_2$ | 24 | 0 |
| $MnCl_2$ | 24 | 0 |

We claim:

1. Transition metal containing composition for use as a bleach catalyst comprising at least one transition metal ion coordinated with at least one ligand to form a complex selected from the group consisting of monomeric, dimeric and oligomeric complexes and mixtures thereof capable of binding peroxide ions; said at least one ligand having at least two, and less than six, strong donor functional groups capable of coordinating with said at least one transition metal ion to form at least one six-member or larger ring; said transition metal containing composition having coordinating positions capable of coordinating peroxide groups in aqueous alkaline solutions and said at least one ligand functioning to substantially prevent precipitation of hydroxides of said transition metal ions in aqueous alkaline solutions of said transition metal containing composition selected from the group consisting of Cu (II), Mn (II), Co (II), Fe (II), Fe (III), Ni (II), Ti (IV), Mo (V), Mo (VI), W (VI), Ru (III), Ru (IV) and mixtures thereof.

2. The composition of claim 1, wherein said transition metal is Cu (II).

3. The composition of claim 1, wherein said transition metal is Mn (II).

4. The composition of claim 1, wherein said transition metal is a mixture of Cu (II) and Mn (II) or Cu (II) and Fe (II) or Cu (II) and Fe (III).

5. The composition of claim 1, wherein said ligand is selected from the group consisting of 2-pyridine acetic acid, 2-aminoethyl pyridine, 2-N-methylaminoethyl pyridine, 2-aminoethylimidazole, 2-imidazole acetic acid, 2-aminoethylquinoline, 2-quinoline acetic acid, dicyclohexyldiamine and mixtures thereof.

6. The composition of claim 1, wherein said complex is monomeric.

7. The composition of claim 1, wherein said complex is dimeric.

8. The composition of claim 1, wherein said complex is oligomeric.

9. The composition of claim 1, wherein said complex is a mixture of dimeric and oligomeric complexes.

10. A detergent-bleach composition comprising an effective amount of a peroxide bleaching agent and an effective amount of a bleach catalyst comprising the transition metal containing composition of claim 1.

11. The detergent-bleach composition of claim 10 containing from about 5% to about 50%, by weight, of said peroxide bleaching agent.

12. The detergent-bleach composition of claim 10 containing from about 1% to about 20%, by weight, of said bleach catalyst.

13. The detergent-bleach composition of claim 10 additionally containing an effective amount of a surface active agent selected from the group consisting of non-ionic, anionic, cationic and zwitterionic detergents and mixtures thereof.

14. The detergent-bleach composition of claim 13 containing from about 1% to about 50%, by weight, of said surface active agent.

15. The detergent-bleach composition of claim 13 additionally containing an effective amount of a detergent builder.

16. The detergent-bleach composition of claim 15 containing up to about 80% by weight of said detergent builder.

17. A bleaching agent composition comprising a peroxide compound present in an amount effective to impart a bleaching action and a catalyst present in an effective amount to promote the bleaching action of said peroxide compound comprising the transition metal composition of claim 1.

18. The bleaching agent composition of claim 17, wherein the peroxide compound is selected from the group consisting of inorganic persalts which yield hydrogen peroxide in water.

19. The bleaching agent composition of claim 18, wherein said inorganic persalt is alkali metal perborate, percarbonate, perphosphate, perpyrophosphate, persilicate or mixture thereof.

20. The bleaching agent composition of claim 17 comprising from about 1% to about 20% by weight of said transition metal composition based on the weight of said bleaching agent composition.

21. A catalyst present in an effective amount to promote the bleaching action of peroxide compounds in a detergent-bleach composition comprising the transition metal composition of claim 1.

* * * * *